United States Patent
Mueller

(10) Patent No.: US 10,940,855 B2
(45) Date of Patent: Mar. 9, 2021

(54) SYSTEMS AND METHODS FOR SELECTIVELY AUTO-PARKING A VEHICLE ACCORDING TO THE PRESENCE OF A PASSENGER

(71) Applicants: Denso International America, Inc., Southfield, MI (US); Denso Corporation, Kariya (JP)

(72) Inventor: Andrew Mueller, Farmington Hills, MI (US)

(73) Assignees: Denso International America, Inc., Southfield, MI (US); Denso Corporation, Kariya (JP)

(*) Notice: Subject to any disclaimer, the term of this patent is extended or adjusted under 35 U.S.C. 154(b) by 209 days.

(21) Appl. No.: 16/272,474

(22) Filed: Feb. 11, 2019

(65) Prior Publication Data

US 2020/0254997 A1    Aug. 13, 2020

(51) Int. Cl.
 *B60W 30/06* (2006.01)
 *B60W 50/14* (2020.01)
 *G06K 9/00* (2006.01)

(52) U.S. Cl.
 CPC ............ *B60W 30/06* (2013.01); *B60W 50/14* (2013.01); *G06K 9/00838* (2013.01); *B60W 2050/146* (2013.01)

(58) Field of Classification Search
 CPC ............. B60W 30/06; B60W 50/14; B60W 2050/146; G06K 9/00838
 See application file for complete search history.

(56) References Cited

U.S. PATENT DOCUMENTS

| | | | |
|---|---|---|---|
| 9,688,220 B2 | 6/2017 | Drake et al. | |
| 10,824,145 B1* | 11/2020 | Konrardy | G06Q 10/1095 |
| 2010/0256852 A1* | 10/2010 | Mudalige | G08G 1/22 701/24 |
| 2015/0266395 A1 | 9/2015 | Bradley et al. | |
| 2018/0005338 A1* | 1/2018 | Kazama | B62D 15/0285 |
| 2018/0345954 A1 | 12/2018 | Gougeon et al. | |

* cited by examiner

*Primary Examiner* — Hussein Elchanti
(74) *Attorney, Agent, or Firm* — Christopher G. Darrow; Darrow Mustafa PC

(57) ABSTRACT

System, methods, and other embodiments described herein relate to providing auto-parking for a vehicle according to the presence of a passenger. In one embodiment, a method includes, in response to receiving a request for the vehicle to auto-park and to determining the passenger is present within the vehicle, analyzing sensor data about the passenger to generate passenger characteristics that indicate at least an age group for the passenger. The method includes determining whether the age group for the passenger satisfies an auto-park threshold that is based, at least in part, on regulations of a locality in which the vehicle is presently located. The method includes selectively executing auto-parking of the vehicle according to whether the age group of the passenger satisfies the auto-park threshold.

20 Claims, 4 Drawing Sheets

SYSTEMS AND METHODS FOR SELECTIVELY AUTO-PARKING A VEHICLE ACCORDING TO THE PRESENCE OF A PASSENGER

TECHNICAL FIELD

The subject matter described herein relates in general to systems and methods for selectively auto-parking a vehicle when a passenger is present in the vehicle and, more particularly, to determining whether the passenger satisfies conditions for auto-parking when present in the vehicle.

BACKGROUND

As autonomy in vehicles improves such that, for example, vehicles can operate with complete autonomy, the ability of such vehicles to perform various driving-related tasks without the presence of an operator also improves. For example, if a vehicle can navigate along a roadway without manual inputs from an operator and while avoiding obstacles, then the vehicle is generally also capable of navigating without the presence of the operator. Accordingly, tasks traditionally associated with driving a vehicle can be automated in order to improve an overall driving experience.

One such example of a task that may be automated is parking the vehicle. That is, because the vehicle can function without inputs from the operator, the vehicle can also park without the presence of the operator. Auto-parking without the operator improves the driving experience by, for example, avoiding time spent by an operator seeking out a parking space, avoiding longer walks from parking spaces in poor weather conditions, and so on. However, along with such functionality comes the potential for abuse, accidents, and other negative outcomes that may result when an operator is not present. This may especially be the case in regards to auto-parking the vehicle when passengers are present in the vehicle. That is, generally, an autonomous vehicle is configured to not permit the use of auto-parking when a passenger remains in the vehicle since the passenger may be a minor, which may result in various difficulties if permitted to auto-park while present. Thus, auto-parking is thereby limited to instances when no passengers are present, which limits overall application of the technology.

SUMMARY

In one embodiment, example systems and methods associated with selectively auto-parking a vehicle when a passenger is present are disclosed. As previously noted, because of concerns about individuals leaving minor children or others that generally require supervision unattended in a vehicle, the vehicle, in various embodiments, restricts an auto-parking function to instances when no passengers remain in the vehicle. However, restricting auto-parking functionality, in this way, can overly limit instances in which the functionality could otherwise be useful.

Therefore, in one embodiment, a parking system dynamically determines whether a passenger is present in the vehicle and, if present, whether characteristics of the passenger satisfy criteria for performing auto-parking while the passenger is present. For example, in one embodiment, the parking system uses sensors within the passenger compartment of the vehicle to estimate an age of the passenger. That is, the parking system may use information from a seat weight sensor to determine a weight of the passenger, information from one or more cameras to determine an overall size, position, seating arrangement (e.g., child safety seat), and so on. In further aspects, the parking system further determines parking regulations (e.g., local laws for leaving an unaccompanied minor in a vehicle).

Accordingly, using the noted information, the parking system can selectively perform auto-parking with the passenger present in the vehicle. In one approach, upon determining that the passenger is likely of an appropriate age group according to the relevant regulations, the parking system generates an override request that is provided to the operator via a user interface. The operator can then affirm to the parking system that the auto-parking is to proceed. In this way, the parking system provides for improving circumstances in which the auto-parking functionality can be employed.

In one embodiment, a parking system for providing auto-parking for a vehicle according to the presence of a passenger is disclosed. The parking system includes one or more processors and a memory that is communicably coupled to the one or more processors. The memory stores a passenger module including instructions that when executed by the one or more processors cause the one or more processors to analyze the program to, in response to receiving a request for the vehicle to auto-park and to determining the passenger is present within the vehicle, analyze sensor data about the passenger to generate passenger characteristics that indicate at least an age group for the passenger. The memory stores a parking module including instructions that when executed by the one or more processors cause the one or more processors to determine whether the age group for the passenger satisfies an auto-park threshold that is based, at least in part, on regulations of a locality in which the vehicle is presently located. The parking module includes instructions to selectively execute auto-parking of the vehicle according to whether the age group of the passenger satisfies the auto-park threshold.

In one embodiment, a non-transitory computer-readable medium is disclosed. The computer-readable medium stores instructions that when executed by one or more processors cause the one or more processors to perform the disclosed functions. The instructions include instructions to, in response to receiving a request for the vehicle to auto-park and to determining the passenger is present within the vehicle, analyze sensor data about the passenger to generate passenger characteristics that indicate at least an age group for the passenger. The instructions include instructions to determine whether the age group for the passenger satisfies an auto-park threshold that is based, at least in part, on regulations of a locality in which the vehicle is presently located. The instructions include instructions to selectively execute auto-parking of the vehicle according to whether the age group of the passenger satisfies the auto-park threshold.

In one embodiment, a method of providing auto-parking for a vehicle according to the presence of a passenger. In one embodiment, a method includes, in response to receiving a request for the vehicle to auto-park and to determining the passenger is present within the vehicle, analyzing sensor data about the passenger to generate passenger characteristics that indicate at least an age group for the passenger. The method includes determining whether the age group for the passenger satisfies an auto-park threshold that is based, at least in part, on regulations of a locality in which the vehicle is presently located. The method includes selectively executing auto-parking of the vehicle according to whether the age group of the passenger satisfies the auto-park threshold.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Figure 1:
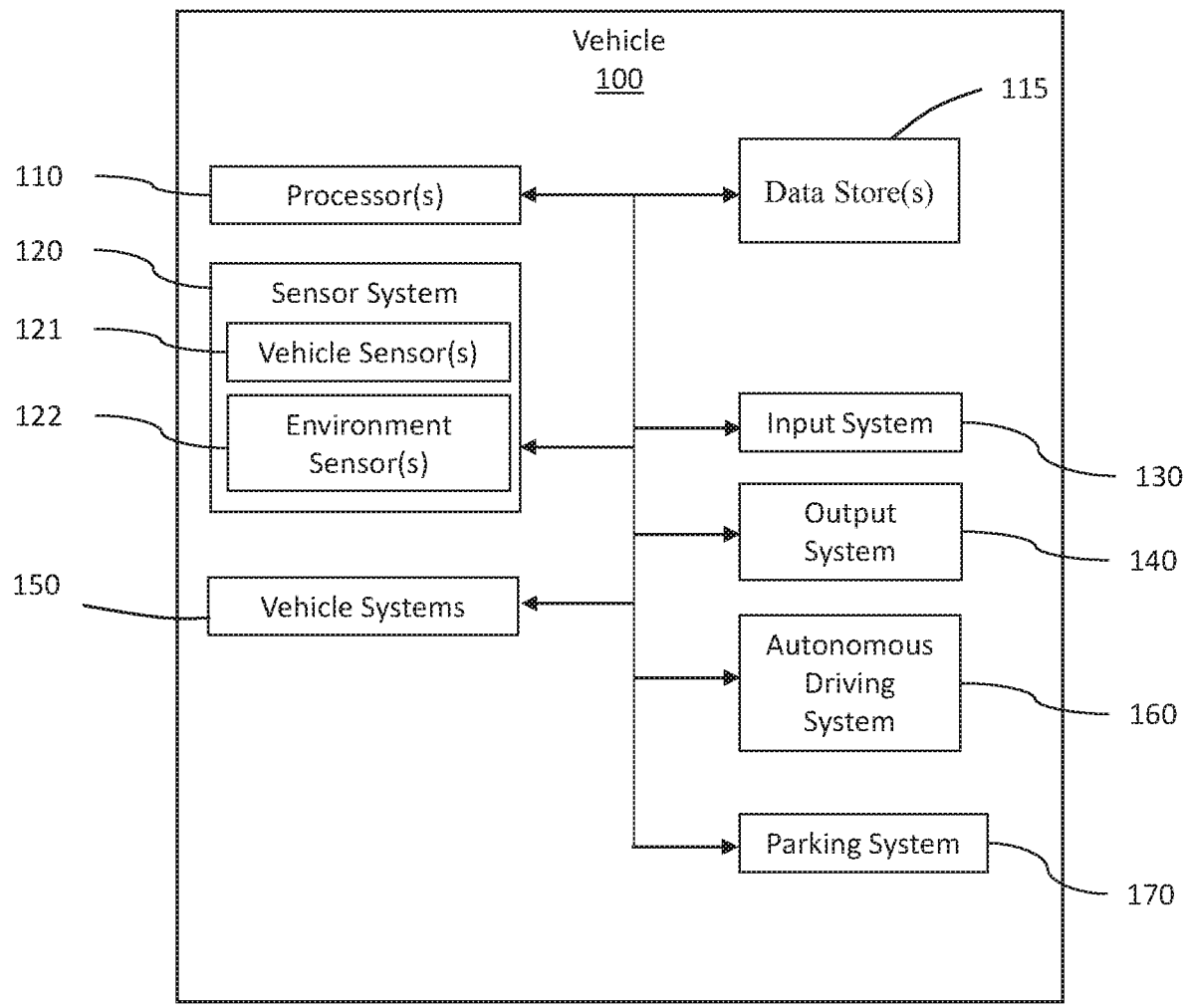
FIG. 1 illustrates one embodiment of a configuration of a vehicle in which examples systems and methods disclosed herein may operate.

Systems, methods, and other embodiments associated with selectively auto-parking a vehicle when a passenger is present in the vehicle are disclosed. As previously noted, because of safety concerns for individuals unattended in a vehicle, in various embodiments, a vehicle does not permit an auto-parking function to execute when a passenger remains in the vehicle regardless of an age of the passenger and/or other circumstances. However, restricting auto-parking functionality, in this way, can limit instances in which the functionality could otherwise be useful.

Therefore, in one embodiment, in response to an auto-parking request, a parking system undertakes an analysis of an interior space of the vehicle to determine whether any passengers are present, and, if present, whether characteristics of the passenger satisfy criteria (e.g., parking threshold) for performing auto-parking while the passenger remains in the vehicle. For example, in one embodiment, the parking system uses sensors within the passenger compartment of the vehicle to estimate an age of the passenger, and, thus, whether the passenger is of an age that is permissible to perform the auto-parking. That is, the parking system may use information from a weight sensor in a seat to determine a weight of the passenger, information from one or more cameras to determine an overall dimensional size (e.g., height), position (e.g., which seat), seating arrangement (e.g., child safety seat) of the passenger, and so on. Moreover, in one or more arrangements, the parking system also determines a current context such as weather conditions, location of parking (e.g., grocery stores vs. sporting event), and so on in order to develop a further context relating to the auto-parking request and whether the request is reasonable in relation to an age of the passenger and the context.

Additionally, in one embodiment, the parking system further determines parking regulations (e.g., local laws for leaving an accompanied minor in a vehicle). That is, depending on a particular legal jurisdiction in which the vehicle is located, age restrictions, time durations and other factors about leaving a minor passenger unattended can vary. Accordingly, using at least the regulations, the parking system generates a parking threshold that defines criteria for which performing the auto-parking with a passenger is acceptable. Therefore, the parking system uses the parking threshold and the passenger characteristics (i.e., estimated age) to determine whether performing the auto-parking is acceptable with the passenger present. If the parking system determines that the presence of the passenger does not satisfy the parking threshold, then the parking system, in one approach, denies the request to auto-park.

In one embodiment, upon determining that the passenger satisfies the parking threshold, the parking system generates and communicates an override request to the operator via a user interface (e.g., a mobile app displayed on a smartphone). The operator can then affirm to the parking system that the auto-parking is to proceed for the passenger. Accordingly, the vehicle then proceeds to navigate through a parking lot or other designated parking area and park the vehicle with the passenger remaining inside. Because the passenger remains in the vehicle and various conditions may change (e.g., weather) over time or the operator may wish to remain informed of the current state of the passenger, the parking system, in one approach, monitors the passenger and conditions (e.g., temperature) within the vehicle. Consequently, if the conditions become unfavorable (e.g., temperature increase, passenger opening car door, etc.), the parking system communicates an alert to the operator in order to inform the operator of the developments. In this way, the parking system provides for improving circumstances in which the auto-parking functionality can be employed while also providing a mechanism for ensuring the passenger remains safe during the auto-parking.

Referring to FIG. 1, an example of a vehicle 100 is illustrated. As used herein, a "vehicle" is any form of powered transport. In one or more implementations, the vehicle 100 is an automobile. While arrangements will be described herein with respect to automobiles, it will be understood that embodiments are not limited to automobiles. In some implementations, the vehicle 100 may be any robotic device or form of powered transport that, for example, can operate autonomously to perform auto-parking and thus benefits from the functionality discussed herein.

The vehicle 100 also includes various elements. It will be understood that in various embodiments the vehicle 100 may not have all of the elements shown in FIG. 1. The vehicle 100 can have different combinations of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Further, the elements shown may be physically separated by large distances and provided as remote services (e.g., cloud-computing services).

Some of the possible elements of the vehicle 100 are shown in FIG. 1 and will be described along with subsequent figures. A description of many of the elements in FIG. 1 will be provided after the discussion of FIGS. 2-4 for purposes of brevity of this description. Additionally, it will be appreciated that for simplicity and clarity of illustration, where appropriate, reference numerals have been repeated among the different figures to indicate corresponding, analogous, or similar elements. Furthermore, it should be understood that the embodiments described herein may be practiced using various combinations of the described elements.

In either case, the vehicle 100 includes a parking system 170 that functions to improve the process of identifying the presence of a passenger and characteristics about the passenger in order to facilitate auto-parking with the passenger present in the vehicle. Moreover, while depicted as a stand-alone component, in one or more embodiments, the parking system 170 is integrated with the autonomous driving system 160, or another component of the vehicle 100. The noted functions and methods will become more apparent with a further discussion of the figures.

Figure 2:
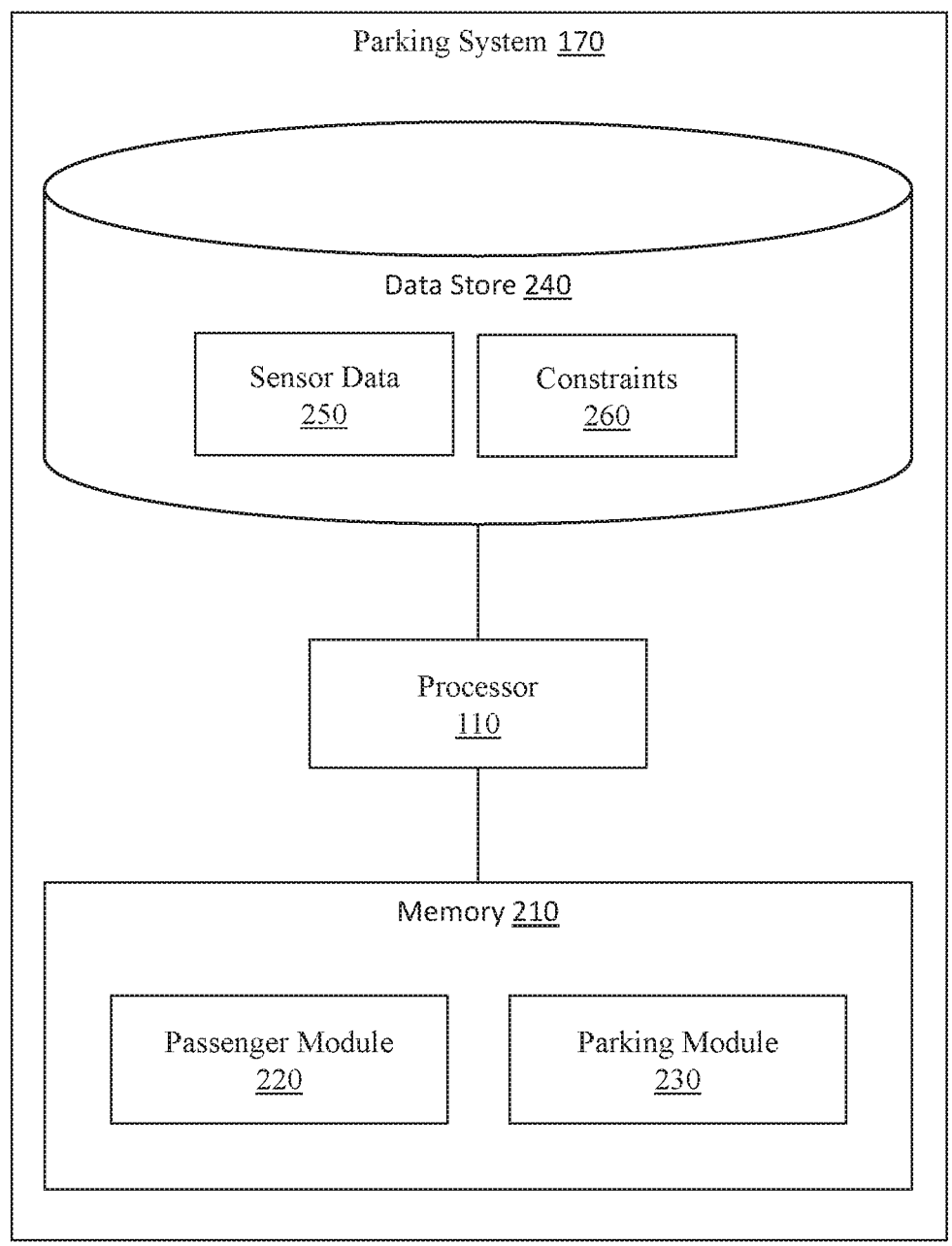
FIG. 2 illustrates one embodiment of a parking system that is associated with selectively auto-parking a vehicle.

With reference to FIG. 2, one embodiment of the parking system 170 is further illustrated. As shown, the parking system 170 includes a processor 110. Accordingly, the processor 110 may be a part of the parking system 170 or the parking system 170 may access the processor 110 through a data bus or another communication path. In one or more embodiments, the processor 110 is an application specific integrated circuit that is configured to implement functions associated with a passenger module 220 and a parking module 230. In general, the processor 110 is an electronic processor such as a microprocessor that is capable of performing various functions as described herein. In one embodiment, the parking system 170 includes a memory 210 that stores the passenger module 220 and the parking module 230. The memory 210 is a random-access memory (RAM), read-only memory (ROM), a hard disk drive, a flash memory, or other suitable memory for storing the modules 220 and 230. The modules 220 and 230 are, for example, computer-readable instructions that when executed by the processor 110 cause the processor 110 to perform the various functions disclosed herein. While, in one or more embodiments, the modules 220 and 230 are instructions embodied in the memory 210, in further aspects, the modules 220 and 230 include hardware such as processing components (e.g., controllers) for independently performing the noted functions.

Furthermore, in one embodiment, the parking system 170 includes a data store 240. The data store 240 is, in one embodiment, an electronically-based data structure for storing information. For example, in one approach, the data store 240 is a database that is stored in the memory 210 or another suitable medium and that is configured with routines that can be executed by the processor 110 for analyzing stored data, providing stored data, organizing stored data, and so on. In either case, in one embodiment, the data store 240 stores data used by the modules 220 and 230 in executing various functions. In one embodiment, the data store 240 includes sensor data 250, and constraints 260 along with, for example, other information that is used by the modules 220 and 230.

Accordingly, the passenger module 220 generally includes instructions that function to control the processor 110 to acquire data inputs from one or more sensors (e.g., sensor system 120) of the vehicle 100 that form the sensor data 250. In general, the sensor data 250 includes information that embodies observations of the interior passenger compartment of the vehicle 100, and, in one embodiment, a surrounding environment of the vehicle 100. Thus, the observations embodied in the sensor data 250 can include, for example, seat sensors indicating a presence and/or a weight of a passenger, camera images providing information about various aspects of the passenger (e.g., a seating arrangement, a height, other age indicating features, etc.), microphones providing interior audio (e.g., a passenger speaking), seat belt sensor information specifying whether a seat belt or child-safety seat is in use, and so on. In further aspects, the passenger module 220 acquires information from the sensor system 120 and/or the vehicle systems 150 about a location of the vehicle 100 and/or other contextual information.

For example, the passenger module 220, in one embodiment, acquires the sensor data 250 to include the observations of the surrounding environment of the vehicle 100. The observations of the surrounding environment, in various embodiments, can include surrounding lanes and vehicles/obstacles that may be present in the lanes, nearby parking structures, nearby businesses, and other contextual information about a location of the vehicle 100. Moreover, the sensor data 250 can include GPS data about a location and, in one aspect, referenced against metadata of a map, data from V2X communications with an electronic parking administrator of a parking lot, and so on. Accordingly, the parking system 170 may be implemented to use multiple sensors of the sensor system 120 including, for example, interior and/or exterior cameras, seat sensors, and so on to acquire the sensor data 250. It should be appreciated that the disclosed approach can be extended to cover further configurations of sensors such as multiple cameras (e.g., interior and exterior), LiDAR sensors in combination with one or more cameras, different types of LiDARs and cameras, combinations of interior and exterior sensors, communication devices for vehicle-to-vehicle (v2v) and/or vehicle-to-anything (V2X) communications, integrated sensors (e.g., IMU, memory seat modules), and so on.

Moreover, as a general matter, the passenger module 220, in one approach, acquires the sensor data 250 and processes (i.e., image recognition) the sensor data 250 to generate observations of the interior of the vehicle 100 and the surrounding environment. In alternative arrangements, the passenger module 220 functions cooperatively with other modules/systems in the vehicle 100. For example, the passenger module 220, in one approach, functions together with the autonomous driving system 160 to implement various routines for performing object/passenger detection and recognition, localization, lane marker/boundary identification, and so on. Thus, the autonomous driving system 160 and the passenger module 220, in one embodiment, use the sensor data 250 to identify aspects of the surrounding environment and/or the interior of the vehicle 100 such as, without limitation, approaching vehicles, characteristics of the approaching vehicles (e.g., size, speed, etc.), environmental characteristics, operational characteristics of the vehicle 100, information about the passenger, and so on.

In either case, the passenger module 220, in one embodiment, controls the respective sensors to provide the data inputs in the form of the sensor data 250. Additionally, while the passenger module 220 is discussed as controlling the various sensors of the sensor system 120 to provide the sensor data 250, in one or more embodiments, the passenger module 220 employs other techniques that are either active or passive to acquire the sensor data 250. The passenger module 220 may passively sniff the sensor data 250 from a stream of electronic information provided by the various sensors to further components within the vehicle 100. Moreover, the passenger module 220 can undertake various approaches to fuse data from multiple sensors when providing the sensor data 250 and/or from sensor data acquired over a wireless communication link (e.g., v2v, WiFi, etc.) from one or more surrounding vehicles and/or wirelessly enabled sensors. Thus, the sensor data 250, in one embodiment, represents a combination of measurements acquired from multiple sensors.

The sensor data 250 itself generally provides information to identify the presence of a passenger and characteristics of the passenger along with, in one or more embodiments, aspects of the surrounding environment such as characteristics of a current location, and so on. Moreover, the passenger module 220, in one embodiment, controls the sensors to acquire the sensor data 250 about all seating areas inside of the vehicle 100 including, for example, a front passenger seat, rear passenger seats, operator seat, cargo area seating, and so on. In one approach, the passenger module 220 controls the sensors to acquire the sensor data 250 about any living passenger of the vehicle including people, and animals (e.g., dogs, cats, etc.). Thus, the passenger module 220 can, in one approach, use the sensors to acquire information about the presence of animal carriers in the cargo or other areas of the vehicle 100, and so on. Similarly, the passenger module 220 can acquire information about child safety seats within the vehicle 100 including location and whether the child safety seat(s) are occupied or not.

Moreover, with further reference to FIG. 2, in one embodiment, the passenger module 220 generally includes instructions that function to control the processor 110 to analyze the sensor data 250 about a passenger to generate passenger characteristics. As a preliminary matter, this discussion generally focuses on circumstances in which a passenger is identified as being within the vehicle 100. Thus, as a preliminary determination, the passenger module 220, in one embodiment, determines whether a passenger is present in the vehicle 100 when, for example, a request to perform auto-parking is received. In one approach, the passenger module 220 uses pressure sensors in seats of the vehicle 100 to determine whether any passengers are present (e.g., the presence of pressure/weight indicates the presence of a passenger). In further approaches, the passenger module 220 uses interior cameras (e.g., visible light or infrared) to identify shapes corresponding with the passengers inside the vehicle 100. In either case, the passenger module 220 progresses with the determination of the passenger characteristics upon determining that the request has been received and at least one passenger remains in the vehicle 100.

Continuing with the determination of the passenger characteristics, in one aspect, the passenger module 220 computes an estimated age of the passenger according to the sensor data 250. For example, as noted, the passenger module 220 acquires the sensor data 250 from various sensors of the sensor system 120. The sensor data 250 by assessing a seating configuration and physical features of the passenger including one or more of weight, and height of the passenger. The passenger module 220, in one approach, analyzes the passenger characteristics against profiles of age groups. Thus, the parking system 170 can store profiles that indicate average height/weight for different age groups from which the passenger module 220 compares the passenger characteristics to estimate an age of the passenger and thus which age group the passenger is classified into.

In further aspects, the passenger module 220 estimates the age of the passenger according to further information such as a seating configuration of the passenger. That is, the passenger module 220 identifies whether the passenger is seated in a child safety seat such as an infant carrier seat, a rear-facing child safety seat, a front-facing child safety seat, a booster seat, or other safety seating in which a child may be seated that is in addition to, for example, an original passenger seat that is equipped in the vehicle 100 upon delivery from an original equipment manufacturer (OEM). Thus, the passenger module 220, in one embodiment, uses images from one or more interior cameras of the vehicle 100 and analyzes the images using image recognition (e.g., machine learning algorithm) to determine whether a passenger is sitting in a child safety seat. In one aspect, because the child safety seat may cause a pressure sensor in a corresponding seat to indicate the presence of a passenger even when one is not present, the passenger module 220 can determine whether a passenger is actually present via the analysis of a corresponding image. Moreover, in a similar regard, because a weight/pressure sensor in the seat measures both the weight of the child safety seat, if present, and the passenger, the weight measurement may be inaccurate for estimating the age of the passenger.

Accordingly, the passenger module 220 may use information about the child safety seat in one or more regards. That is, the passenger module 220, in one embodiment, subtracts a known or estimated weight for the type of the car seat from the weight measurement provided by the sensor. In further approaches, if the passenger module 220 identifies a passenger in a child safety seat, then the passenger module 220 bases the age estimate on the fact that the child is riding in the child safety seat. Thus, the passenger module 220 either assumes the passenger is a child under the age of, for example, six years or bases the age estimate on a type of the seat. For example, a child riding in a booster seat is likely over the age of six years while a child riding in other types of seats (e.g., carrier, rear-facing, etc.) is likely under six years. In either case, the passenger module 220 can use the sensor data 250 to generate an estimate of the age of the passenger.

In still further aspects, as briefly noted previously, the passenger module 220 determines whether an animal (e.g., dog, cat, etc.) is present in the vehicle 100. The passenger module 220 can use image recognition techniques to identify the presence of the animal within an interior space of the vehicle 100 whether in a pet carrier or whether free roaming/buckled. In one embodiment, the passenger module 220 treats the presence of an animal similar to, for example, the presence of an infant child, and thus as an unacceptable unsupervised passenger. Accordingly, the parking module 230 generally denies the auto-parking when an animal is present, although, in one or more embodiments, the parking module 230 may permit such auto-parking according to defined preferences and acceptable local regulations.

With continued reference to FIG. 2, in one embodiment, the parking module 230 generally includes instructions that function to control the processor 110 to determine whether the vehicle should be permitted to auto-park while the passenger remains in the vehicle 100. The parking module 230, in one approach, determines whether an age group for the passenger satisfies an auto-park threshold.

First, consider the auto-park threshold. The parking module 230 may derive the auto-park threshold dynamically according to one or more criteria. For example, the parking module 230 determines information about auto-parking for the present locality of the vehicle 100 including legal regulations governing whether passengers, and/or pets may be left unattended in the vehicle 100 and conditions associated with such circumstances. Accordingly, the parking module 230, in one embodiment, determines the regulations according to a database of regulations stored in the data store 240, according to available online (e.g., Internet) regulatory indexes, or another suitable source (e.g., cloud-based service for providing the regulation).

In either case, the parking module 230 retrieves the regulations and determines therefrom the age groups for which auto-parking with an unattended passenger is acceptable and other conditions (e.g., duration, locations, etc.). In one embodiment, the parking module 230 determines the regulations also for leaving animals (e.g., dogs, cats) unattended in a vehicle 100. Thus, the parking module 230 stores this information as the constraints 260, and from this information, the parking module 230 derives the parking threshold. The parking threshold defines the criteria for determining whether auto-parking with the passenger present is permissible. Accordingly, the parking threshold, in one approach, defines an age range of the passenger that is excluded from auto-parking.

In further aspects, the parking threshold, in addition to the age range, also defines characteristics of the parking location and/or other contextual information (e.g., weather) that are to be satisfied in order for the parking module 230 to proceed with auto-parking the vehicle 100. For example, in one approach, the parking module 230 determines aspects of the current location of the vehicle 100. The aspects about the current location can include what type of location the vehicle 100 is to park in (e.g., parking structure, exposed surface lot, etc.), a location being visited by the operator/owner of the vehicle 100 (e.g., grocery stores, sporting venue, etc.), times of day (e.g., daytime, night, day of the week, etc.), and so on. Moreover, as noted, the contextual information can include information about the weather (e.g., hot sunny day versus cold), proclivity for crime, and so on. The noted contextual information is assessed in order to determine a likely duration that the vehicle 100 will be parked, conditions while parked (e.g., heat), and so on.

The parking module 230 then uses the contextual information to, in one approach, adapt the parking threshold. That is, for a parking event having negative contextual information such as a longer parking event, exposure to higher temperatures, etc., the parking module 230 adjusts the age range upward or denies the request overall. Accordingly, the parking module 230 better ensures the safety of the passenger by, for example, denying the auto-parking of the vehicle 100 when the passenger may be exposed to negative circumstances.

In either case, the parking module 230 compares the passenger characteristics (e.g., age) with the parking threshold to determine whether to permit the auto-parking. When the parking module 230 determines that the passenger characteristics do not satisfy the parking threshold, then the parking module 230 denies the request for auto-parking. In one embodiment, denying the auto-parking request by the parking module 230 includes the parking module 230 generating a communication that specifies the reasons for denying the request and providing (e.g., transmitting) the communication to a user interface for display to the owner/operator. The reasoning can include text that specifies the local regulations, the contextual information, the perceived age of the passenger, and so on.

Similarly, when the parking module 230 determines that the estimated age of the passenger does satisfy the parking threshold, then the parking module 230, in one arrangement, instead of automatically initiating the auto-parking, first generates and provides an override request to a user interface of the owner/operator. For example, the parking module 230 generates the override request to include the text of the regulation that is presented to the operator/owner via the user display and requests the operator/owner to affirm that the passenger satisfies the conditions for auto-parking the vehicle 100.

Thus, upon the parking module 230 receiving an affirmative response to the override request, the parking module 230 initiates the auto-parking of the vehicle 100. In one embodiment, the parking module 230 provides an electronic signal to, for example, an autonomous driving system 160 of the vehicle 100 specifying that the vehicle 100 is to auto-park in order to initiate auto-parking. The signal, in various embodiments, may include different information but generally indicates at least the request to auto-park and may indicate additional information such as a general location in which to park, the presence of the passenger in the vehicle, the affirmation of the override request, and so on.

Moreover, after the auto-park has been initiated, the passenger module 220, in one embodiment monitors a current state of the passenger including a presence of the passenger in the vehicle 100 and environmental conditions within the vehicle. Thus, if the passenger module 220 detects conditions in the vehicle of the current state of the passenger that exceed parking criteria (e.g., environmental conditions, door opening, vibration of the car from outside sources), then the passenger module 220 generates an alert that is communicated to the user interface of the operator/owner. In further aspects, the passenger module 220 communicates the alert to police, EMS, or another authority depending on the nature of the current state of the passenger. Furthermore, the passenger module 220 can communicate at least a portion of the sensor data 250 (e.g., images, interior temperature of the vehicle) from the vehicle 100 as part of the alert.

Figure 3:
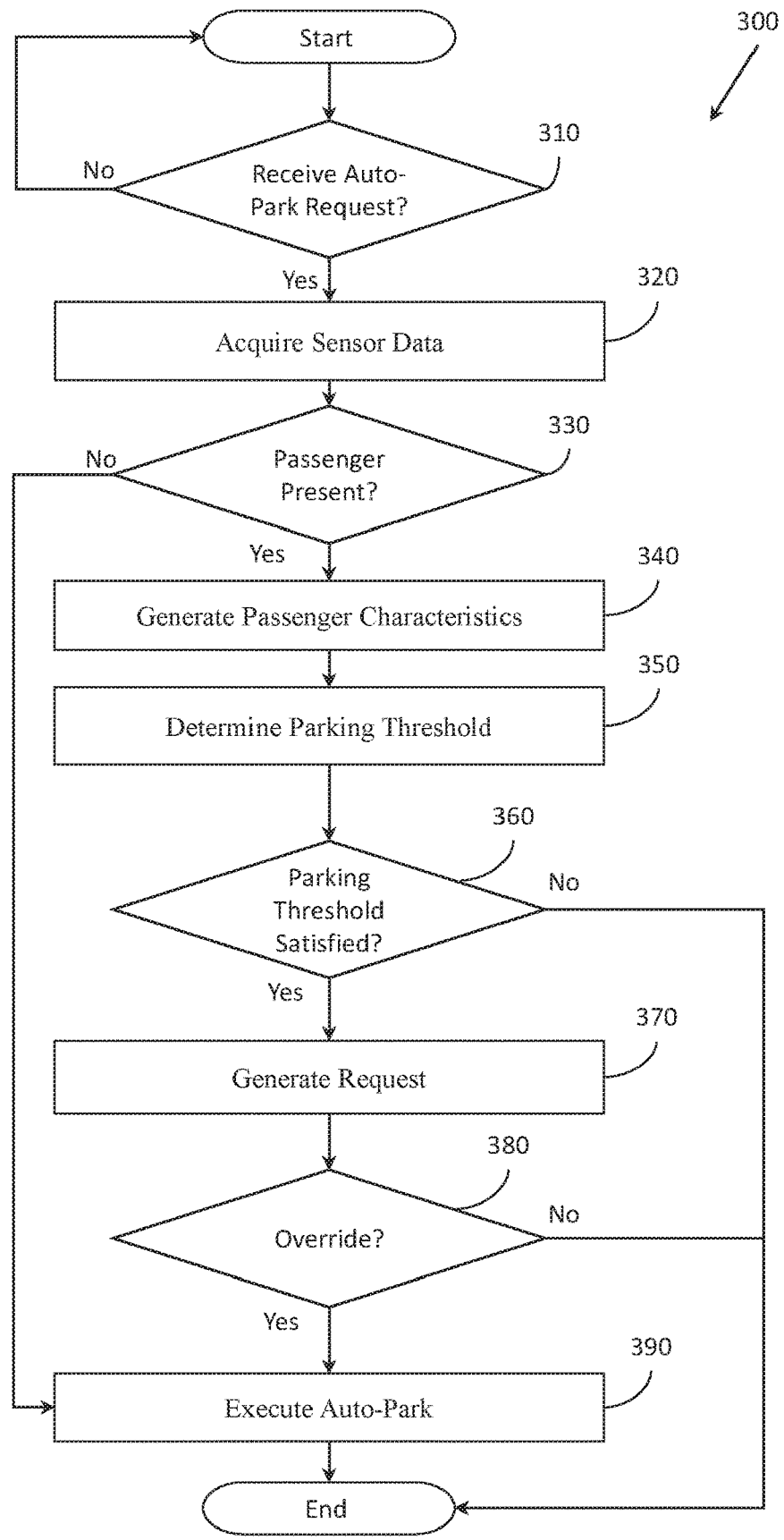
FIG. 3 illustrates one embodiment of a method associated with controlling whether a vehicle performs auto-parking when a passenger remains in the vehicle.

Additional aspects of selectively auto-parking when a passenger is present in a vehicle will be discussed in relation to FIG. 3. FIG. 3 illustrates a method 300 associated with detecting whether a passenger remains in a vehicle in response to an auto-parking request and selectively auto-parking the vehicle with the passenger present therein. Method 300 will be discussed from the perspective of the parking system 170 of FIG. 1. While method 300 is discussed in combination with the parking system 170, it should be appreciated that the method 300 is not limited to being implemented within the parking system 170 but is instead one example of a system that may implement the method 300.

At 310, the passenger module 220 monitors for a request to auto-park the vehicle 100. The request is, for example, communicated to the passenger module 220 over a vehicle bus (e.g., CAN bus) or another communication medium (e.g., wirelessly). In one embodiment, the request is generated by, for example, a component of the vehicle 100 such as a process executing on a controller associated with a user interface (e.g., infotainment display, an integrated button). In further examples, the request is generated by and communicated from a personal device of an owner/operator such as an application executing on a mobile phone. In either case, the passenger module 220 monitors for such a request and upon receiving the request induces the parking system 170 to execute further functions in support of determining whether the auto-park request should be serviced.

At 320, the passenger module 220 acquires the sensor data 250. In one embodiment, the passenger module 220 acquires the sensor data 250 in order to subsequently determine whether a passenger is present and determine characteristics of such a passenger. Thus, the passenger module 220 acquires, in one embodiment, images of an interior space of the vehicle 100, weight/pressure data from weight/pressure sensors, audio data, and/or any other data that may be used by the passenger module 220 to classify the passenger and perform the noted analysis. In further aspects, the passenger module 220 also acquires or at least induces the acquisition of sensor data about the external environment of the vehicle 100 to inform the determination of the park threshold as discussed subsequently.

At 330, the passenger module 220 determines whether a passenger is present within the vehicle 100. As previously noted, for purposes of this discussion the term "passenger" is broadly defined to encompass both people and animals present within the vehicle. Moreover, as the vehicle 100 is generally understood to be a fully autonomous vehicle, the term passenger as used herein is not intended to be directed to only those individuals seated in traditional passenger seats in the vehicle 100 but may also include an individual seated in a driver/operator seat of the vehicle 100. In either case, the passenger module 220 uses the sensor data 250 and performs an analysis of the sensor data 250 using a heuristic, a machine learning algorithm, or another approach to identify whether one or more passengers are present in the vehicle 100.

In one approach, the passenger module 220 analyzes the sensor data 250 according to presence criteria to determine whether the sensor data 250 includes patterns of observations matching the presence of at least one passenger in the vehicle 100. The presence criteria may include positive signals from pressure sensors in one or more seats, signals from one or more corresponding seat belt buckles indicating the buckles are active, and so on. In further aspects, the presence criteria further include infrared signatures, image signatures, and so on. If the passenger module 220 determines that there is no passenger present in the vehicle 100, then the passenger module 220 provides a negative signal to the parking system 170, and the parking system 170 proceeds with activating the auto-parking function at 390. Otherwise, the passenger module 220 proceeds with determining information about the passenger(s) as discussed at 340.

At 340, the passenger module 220 analyzes the sensor data 250 to generate passenger characteristics. As previously noted, the passenger characteristics specify at least an estimated age and thus an age group for the passenger in relation to local regulations as determined subsequently. In general, the passenger module 220 computes an estimated age of the passenger according to the sensor data 250 by assessing information including one or more of a seating configuration and physical features of the passenger. The physical features include at least a weight but may also include a height of the passenger, if available. The seating configuration identifies whether the passenger is seated in a child safety seat and, in one embodiment, a type of the seat. As previously noted, the seating type may influence the weight determination, but may also be indicative of an age of the passenger.

At 350, the parking system 170 determines the parking threshold. In one embodiment, determining the parking threshold includes, in part, determining regulations associated with a location of the vehicle 100. In various embodiments, the acquisition of the regulations and other contextual information may be undertaken by different components depending on a particular implementation. Thus, in one embodiment, the parking module 230 acquires the regulations, which define at least age ranges for which performing auto-parking with the passenger in the vehicle is permissible. As previously specified, the regulations may further define conditions beyond an age such as acceptable locations, times, durations, weather conditions, and so on.

Moreover, in one approach, determining the parking threshold further includes determining contextual information about the vehicle 100 such as information about a current location (e.g., type of business, intent of parking, etc.), information about parking arrangements (e.g., type of parking lot/structure), weather conditions, and other contextual information about the location and/or conditions of the location that influence the well-being of the passenger. By way of example, the parking module 230 uses the noted contextual information to, for example, bias the parking threshold. That is, even though the regulations for a particular location may specify, for example, anyone 6 years and older may be left unattended in a vehicle, the parking module 230 adjusts the specified age upward according to contextual information that is considered to be negative to the experience of the passenger.

For example, the parking module 230 may increase the age when weather conditions are hot, the parking lot is exposed, the likely duration of the parking is longer (determined from location type, e.g., convenience stores vs. grocery store), and so on. Thus, in such an example, the parking module 230 may bias the parking threshold according to an extent that corresponds with the conditions to indicate the acceptable age is, for example, 13 years instead of 6 years. In this way, the parking module 230 more selectively permits the auto-parking to avoid difficulties with passengers of younger ages. It should be noted that in further approaches, the parking module 230 simply specifies limits on the conditions such as limits on exterior temperatures, locations, and so on. Accordingly, when subsequently determining whether the passenger characteristics satisfy the threshold, the parking module 230 compares the estimated age but may also compare the identified contextual information with defined constraints (e.g., constraints 260) on the contextual information.

At 360, the parking module 230 determines whether the age group for the passenger satisfies the parking threshold. In one embodiment, the parking module 230 compares the age of the passenger to the threshold determined at block 350 to identify whether performing the auto-parking is permissible according to at least the regulations. If the parking module 230 determines that the age group of the passenger does not satisfy (e.g., exceed) the parking threshold, then the parking module 230, in one embodiment, denies execution of the auto-parking. In further aspects, instead of denying the auto-parking request according to the determined age group of the passenger, the parking module 230 permits the operator/user to override the determination of the system 170, as discussed in relation to blocks 370 and 380 subsequently. That is, for example, the parking module 230 can generate a request that is provided to a user interface and that indicates an option for overriding the determination of the system 170. In various approaches, the option to override a negative determination of the system 170 may be limited to particular circumstances such as when a weight of the passenger is below an expected value, when the overall determination has a relatively low confidence associated therewith, etc. Additionally, the override request itself may specify the reasons for denial (e.g., predicted age) along with local laws. In either case, when the parking module 230 determines that the age of the passenger satisfies the parking threshold, then the parking module 230, instead of immediately inducing the auto-parking may undertake further actions as specified at 370.

At 370, the parking module 230 generates an override request. That is, because performing auto-parking with a passenger present was in previous systems not implemented, the parking module 230 may require that the requestor (e.g., owner/operator) affirm that the auto-parking proceed with the presence of the passenger. As such, the parking module 230, in one embodiment, generates an override request and communicates the override request to a human-machine interface (HMI) device such as an infotainment display, a smartphone, or other suitable device for display to the requestor. The override request is generally a communication that is requesting approval of the auto-parking of the vehicle with the passenger. In various approaches, the parking module 230 can generate the override request to include various information such as the regulation, the contextual information, defined constraints, the perceived/estimated age of the passenger and so on. Of course, in various approaches, the parking system 170 may forgo the override request and proceed with the auto-parking.

In either case, the override request is a request for affirmation/response from the requestor. Accordingly, at 380, if the parking module 230 receives an affirmative response to proceed with the auto-parking, then the parking module 230 performs additional functions at 390 to induce the auto-parking. However, if, at 380, the parking module 230 receives a negative response, then the parking module 230 denies the request and ends without inducing the auto-parking.

At 390, the parking module 230 controls the vehicle 100 to autonomously navigate and park without the presence of an operator in the vehicle 100. In one embodiment, the parking module 230 can perform the various functions to control the vehicle 100 to park without manual inputs from an operator or even without the presence of the operator. However, in further aspects, the parking module 230 provides an electronic request to an autonomous system of the vehicle such as the autonomous driving system 160, which performs the combination of actions using sensor data from, for example, the sensor system 120 to autonomously navigate and park the vehicle 100.

In one embodiment, as an additional aspect of executing the auto-parking of the vehicle 100 with a passenger present in the vehicle, the passenger module 220 in response to executing the auto-parking of the vehicle 100, monitors a current state of the passenger. The current state of the passenger includes, in one or more embodiments, a presence of the passenger in the vehicle 100 and environmental conditions within the vehicle 100. In further aspects, the passenger module 220 can be configured to monitor any relevant aspects for which the sensor system 120 produces sensor data. For example, the passenger module 220 can monitor audio data, image data, door latch sensors, seat belt sensors, pressure sensors, temperatures, vehicle state, and so on.

When the current state of the passenger exceeds the defined parking criteria (e.g., constraints 260), the passenger module 220 communicates an alert to a user interface. Thus, more generally, the parking criteria specify aspects of the presence of the passenger and the environmental conditions to ensure the passenger remains safe. As such, when the noted conditions violate the parking criteria, the user or other authority is informed in order to ensure the safety of the passenger.

Figure 4:
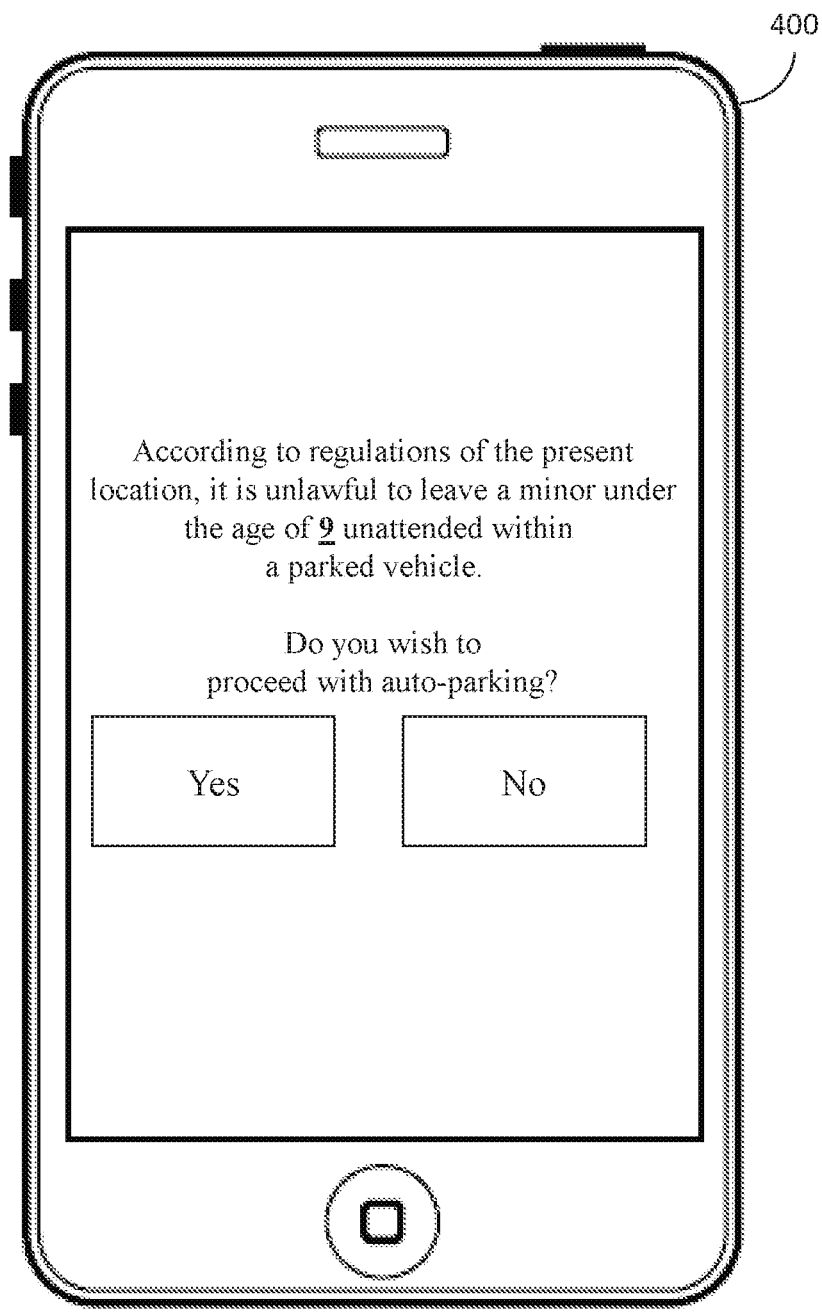
FIG. 4 illustrates one example of a personal mobile device with a user interface that provides information to a user about the performance of the auto-parking.

As one example of a user interface, consider FIG. 4, which illustrates a front view of a smartphone 400. A display on the smartphone is rendering a user interface that includes an override request as discussed in relation to block 380 of method 300. Similarly, the user interface of the smartphone 400 can display the noted alert from monitoring the passenger and/or other information or interactive elements for the user to interact with the vehicle 100 before and/or during the auto-parking.

Additionally, it should be appreciated that the parking system 170 from FIG. 1 can be configured in various arrangements with separate integrated circuits and/or chips. In such embodiments, the passenger module 220 is embodied as a separate integrated circuit. Additionally, the parking module 230 is embodied on an individual integrated circuit. The circuits are connected via connection paths to provide for communicating signals between the separate circuits. Of course, while separate integrated circuits are discussed, in various embodiments, the circuits may be integrated into a common integrated circuit board. Additionally, the integrated circuits may be combined into fewer integrated circuits or divided into more integrated circuits. In another embodiment, the modules 220 and 230 may be combined into a separate application-specific integrated circuit. In further embodiments, portions of the functionality associated with the modules 220 and 230 may be embodied as firmware executable by a processor and stored in a non-transitory memory. In still further embodiments, the modules 220 and 230 are integrated as hardware components of the processor 110.

In another embodiment, the described methods and/or their equivalents may be implemented with computer-executable instructions. Thus, in one embodiment, a non-transitory computer-readable medium is configured with stored computer executable instructions that when executed by a machine (e.g., processor, computer, and so on) cause the machine (and/or associated components) to perform the method.

While for purposes of simplicity of explanation, the illustrated methodologies in the figures are shown and described as a series of blocks, it is to be appreciated that the methodologies (e.g., method 300 of FIG. 3) are not limited by the order of the blocks, as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional blocks that are not illustrated.

FIG. 1 will now be discussed in full detail as an example environment within which the system and methods disclosed herein may operate. In some instances, the vehicle 100 is configured to switch selectively between an autonomous mode, one or more semi-autonomous operational modes, and/or a manual mode. Such switching can be implemented in a suitable manner. "Manual mode" means that all of or a majority of the navigation and/or maneuvering of the vehicle is performed according to inputs received from a user (e.g., human driver).

In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is fully automated. In one embodiment, the vehicle 100 is configured with one or more semi-autonomous operational modes in which one or more computing systems perform a portion of the navigation and/or maneuvering of the vehicle 100 along a travel route, and a vehicle operator (i.e., driver) provides inputs to the vehicle to perform a portion of the navigation and/or maneuvering of the vehicle 100 along a travel route. Such semi-autonomous operation can include supervisory control as implemented by the parking system 170 to ensure the vehicle 100 remains within defined state constraints.

The vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 (e.g., data store 240) for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operatively connected to the processor(s) 110 for use thereby. The term "operatively connected," as used throughout this description, can include direct or indirect connections, including connections without direct physical contact.

In one or more arrangements, the one or more data stores 115 can include map data. The map data can include maps of one or more geographic areas. In some instances, the map data can include information (e.g., metadata, labels, etc.) on roads, traffic control devices, road markings, structures, features, and/or landmarks in the one or more geographic areas. In some instances, the map data can include aerial/satellite views. In some instances, the map data can include ground views of an area, including 360-degree ground views. The map data can include measurements, dimensions, distances, and/or information for one or more items included in the map data and/or relative to other items included in the map data. The map data 116 can include a digital map with information about road geometry. The map data can further include feature-based map data such as information about relative locations of buildings, curbs, poles, etc. In one or more arrangements, the map data can include one or more terrain maps. In one or more arrangements, the map data can include one or more static obstacle maps. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level.

The one or more data stores 115 can include sensor data (e.g., sensor data 250). In this context, "sensor data" means any information from the sensors that the vehicle 100 is equipped with, including the capabilities and other information about such sensors.

As noted above, the vehicle 100 can include the sensor system 120. The sensor system 120 can include one or more sensors. "Sensor" means any device, component and/or system that can detect, perceive, and/or sense something. The one or more sensors can be configured to operate in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such a case, the two or more sensors can form a sensor network. The sensor system 120 and/or the one or more sensors can be operatively connected to the processor(s) 110, the data store(s) 115, and/or another element of the vehicle 100 (including any of the elements shown in FIG. 1). The sensor system 120 can acquire data of at least a portion of the external environment of the vehicle 100.

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 100 itself or interior compartments of the vehicle 100. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100. Moreover, the vehicle sensor system 121 can include sensors throughout a passenger compartment such as pressure/weight sensors in seats, seatbelt sensors, camera(s), and so on.

Alternatively, or in addition, the sensor system 120 can include one or more environment sensors 122 configured to acquire, and/or sense driving environment data. "Driving environment data" includes data or information about the external environment in which an autonomous vehicle is located or one or more portions thereof. For example, the one or more environment sensors 122 can be configured to detect and/or sense obstacles in at least a portion of the external environment of the vehicle 100 and/or information/data about such obstacles. Such obstacles may be stationary objects and/or dynamic objects. The one or more environment sensors 122 can be configured to detect, and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more radar sensors, one or more LIDAR sensors, one or more sonar sensors, and/or one or more cameras. In one or more arrangements, the one or more cameras 126 can be high dynamic range (HDR) cameras or infrared (IR) cameras.

The vehicle 100 can include an input system 130. An "input system" includes, without limitation, devices, components, systems, elements or arrangements or groups thereof that enable information/data to be entered into a machine. The input system 130 can receive an input from a vehicle passenger (e.g., an operator or a passenger). The vehicle 100 can include an output system 140. An "output system" includes any device, component, or arrangement or groups thereof that enable information/data to be presented to a vehicle passenger (e.g., a person, a vehicle passenger, etc.).

The vehicle 100 can include one or more vehicle systems 150. Various examples of the one or more vehicle systems 150 are shown in FIG. 1, however, the vehicle 100 can include a different combination of systems than illustrated in the provided example. In one example, the vehicle 100 can include a propulsion system, a braking system, a steering system, throttle system, a transmission system, a signaling system, a navigation system, and so on. The noted systems can separately or in combination include one or more devices, components, and/or a combination thereof.

By way of example, the navigation system can include one or more devices, applications, and/or combinations thereof configured to determine the geographic location of the vehicle 100 and/or to determine a travel route for the vehicle 100. The navigation system can include one or more mapping applications to determine a travel route for the vehicle 100. The navigation system can include a global positioning system, a local positioning system or a geolocation system.

The processor(s) 110, the parking system 170, and/or the autonomous driving system 160 can be operatively connected to communicate with the various vehicle systems 150 and/or individual components thereof. For example, returning to FIG. 1, the processor(s) 110 and/or the autonomous driving system 160 can be in communication to send and/or receive information from the various vehicle systems 150 to control the movement, speed, maneuvering, heading, direction, etc. of the vehicle 100. The processor(s) 110, the parking system 170, and/or the autonomous driving system 160 may control some or all of these vehicle systems 150 and, thus, may be partially or fully autonomous.

The processor(s) 110, the parking system 170, and/or the autonomous driving system 160 can be operatively connected to communicate with the various vehicle systems 150 and/or individual components thereof. For example, returning to FIG. 1, the processor(s) 110, the parking system 170, and/or the autonomous driving system 160 can be in communication to send and/or receive information from the various vehicle systems 150 to control the movement, speed, maneuvering, heading, direction, etc. of the vehicle 100. The processor(s) 110, the parking system 170, and/or the autonomous driving system 160 may control some or all of these vehicle systems 150.

The processor(s) 110, the parking system 170, and/or the autonomous driving system 160 may be operable to control the navigation and/or maneuvering of the vehicle 100 by controlling one or more of the vehicle systems 150 and/or components thereof. For instance, when operating in an autonomous mode, the processor(s) 110, the parking system 170, and/or the autonomous driving system 160 can control the direction and/or speed of the vehicle 100. The processor(s) 110, the parking system 170, and/or the autonomous driving system 160 can cause the vehicle 100 to accelerate (e.g., by increasing the supply of energy provided to the engine), decelerate (e.g., by decreasing the supply of energy to the engine and/or by applying brakes) and/or change direction (e.g., by turning the front two wheels).

Moreover, the parking system 170 and/or the autonomous driving system 160 can function to perform various driving-related tasks such as parking the vehicle 100. That is, in one embodiment, the parking system 170, and/or the autonomous driving system 160 function to identify a suitable parking location and maneuver the vehicle 100 to the parking location/spot. In various approaches, this auto-parking functionality may further include communicating with one or more infrastructure devices (e.g., parking meters/systems) to pay fees, locate parking spots, and so on.

The vehicle 100 can include one or more actuators. The actuators can be any element or combination of elements operable to modify, adjust and/or alter one or more of the vehicle systems or components thereof to responsive to receiving signals or other inputs from the processor(s) 110 and/or the autonomous driving system 160. Any suitable actuator can be used. For instance, the one or more actuators can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving system 160. The autonomous driving system 160 can be configured to receive data from the sensor system 120 and/or any other type of system capable of capturing information relating to the vehicle 100 and/or the external environment of the vehicle 100. In one or more arrangements, the autonomous driving system 160 can use such data to generate one or more driving scene models. The autonomous driving system 160 can determine position and velocity of the vehicle 100. The autonomous driving system 160 can determine the location of obstacles, obstacles, or other environmental features including traffic signs, trees, shrubs, neighboring vehicles, pedestrians, etc.

The autonomous driving system 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The autonomous driving system 160 either independently or in combination with the parking system 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source such as determinations from the sensor data 250. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving system 160 can be configured to implement determined driving maneuvers. The autonomous driving system 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving system 160 can be configured to execute various vehicle functions and/or to transmit data to, receive data from, interact with, and/or control the vehicle 100 or one or more systems thereof (e.g., one or more of vehicle systems 150).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-4, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Examples of such a computer-readable medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device can read. In the context of this document, a computer-readable storage medium may be any tangible medium that can contain, or store a program for use by or in connection with an instruction execution system, apparatus, or device.

The following includes definitions of selected terms employed herein. The definitions include various examples and/or forms of components that fall within the scope of a term and that may be used for various implementations. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Module," as used herein, includes a computer or electrical hardware component(s), firmware, a non-transitory computer-readable medium that stores instructions, and/or combinations of these components configured to perform a function(s) or an action(s), and/or to cause a function or action from another logic, method, and/or system. Module may include a microprocessor controlled by an algorithm, a discrete logic (e.g., ASIC), an analog circuit, a digital circuit, a programmed logic device, a memory device including instructions that when executed perform an algorithm, and so on. A module, in one or more embodiments, includes one or more CMOS gates, combinations of gates, or other circuit components. Where multiple modules are described, one or more embodiments include incorporating the multiple modules into one physical module component. Similarly, where a single module is described, one or more embodiments distribute the single module between multiple physical components.

Additionally, module as used herein includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the device 100, as a stand-alone software package, partly on a remote computer, or entirely on the remote computer or server. In the latter scenario, the remote computer may be connected to the device 100 through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A parking system for providing auto-parking for a vehicle according to a presence of a passenger, comprising:
   one or more processors;
   a memory communicably coupled to the one or more processors and storing:
   a passenger module including instructions that when executed by the one or more processors cause the one or more processors to, in response to receiving a request for the vehicle to auto-park and to determining the passenger is present within the vehicle, analyze sensor data about the passenger to generate passenger characteristics that indicate at least an age group for the passenger; and
   a parking module including instructions that when executed by the one or more processors cause the one or more processors to determine whether the age group for the passenger satisfies an auto-park threshold that is based, at least in part, on regulations of a locality in which the vehicle is presently located, and
   wherein the parking module includes instructions to selectively execute auto-parking of the vehicle according to whether the age group of the passenger satisfies the auto-park threshold.

2. The parking system of claim 1, wherein the parking module includes instructions to selectively execute the auto-parking including instructions to deny execution of the auto-parking when at least one of i. the age group does not satisfy the auto-park threshold, and ii. the age group does satisfy the auto-park threshold and a response to an override request is negative, and
   wherein the override request is a request communicated to a user interface requesting approval of the auto-parking of the vehicle with the passenger, the override request specifying the regulations to an operator.

3. The parking system of claim 1, wherein the parking module includes instructions to selectively execute auto-parking of the vehicle including instructions to control the vehicle to autonomously navigate and park without the presence of an operator in the vehicle in response to an override request that affirms that the auto-parking is to proceed, and
   wherein the parking module includes instructions to selectively execute auto-parking including instructions to communicate the override request to the operator when a passenger is present and indicating whether the age group for the passenger satisfies an auto-park threshold.

4. The parking system of claim 1, wherein the parking module includes instructions to determine whether the age group of the passenger satisfies the auto-park threshold including instructions to i. determine a current location of the vehicle, ii. retrieve the regulations for the current location from a database, and iii. compare the age group of the passenger to the regulations to identify whether performing the auto-parking is permissible according to the regulations, and
   wherein the regulations define at least age ranges for which performing auto-parking with the passenger in the vehicle is permissible.

5. The parking system of claim 1, wherein the passenger module includes instructions to analyze the sensor data about the passenger to generate the passenger characteristics including instructions to compute an estimated age of the passenger according to the sensor data by assessing a seating configuration and physical features of the passenger including one or more of weight and height of the passenger, and
   wherein the seating configuration identifies at least whether the passenger is seated in a child safety seat.

6. The parking system of claim 1, wherein the passenger module includes instructions to
   determine whether the passenger is present in the vehicle by:
   acquiring the sensor data from one or more sensors in the vehicle that include observations of a passenger compartment, and
   analyzing the sensor data according to presence criteria to determine whether the sensor data includes patterns of observations matching the presence of at least one passenger in the vehicle.

7. The parking system of claim 1, wherein the passenger module includes instructions to, in response to executing the auto-parking of the vehicle, monitor a current state of the passenger including a presence of the passenger in the vehicle and environmental conditions within the vehicle; and
   communicate an alert to a user interface when the current state of the passenger exceeds parking criteria, the parking criteria specifying aspects of the presence of the passenger and the environmental conditions to ensure the passenger remains safe.

8. The parking system of claim 1, wherein the vehicle is an autonomous vehicle, and wherein the regulations define conditions including one or more of types of locations, times of day, and weather for which performing the auto-parking with the passenger is permissible.

9. A non-transitory computer-readable medium storing instructions for providing auto-parking for a vehicle according to a presence of a passenger and that when executed by one or more processors, cause the one or more processor to:
in response to receiving a request for the vehicle to auto-park and to determining the passenger is present within the vehicle, analyze sensor data about the passenger to generate passenger characteristics that indicate at least an age group for the passenger;
determine whether the age group for the passenger satisfies an auto-park threshold that is based, at least in part, on regulations of a locality in which the vehicle is presently located; and
selectively execute auto-parking of the vehicle according to whether the age group of the passenger satisfies the auto-park threshold.

10. The non-transitory computer-readable medium of claim 9, wherein the instructions to selectively execute the auto-parking include instructions to deny execution of the auto-parking when at least one of i. the age group does not satisfy the auto-park threshold, and ii. the age group does satisfy the auto-park threshold and a response to an override request is negative, and
wherein the override request is a request communicated to a user interface requesting approval of the auto-parking of the vehicle with the passenger, the override request specifying the regulations to an operator.

11. The non-transitory computer-readable medium of claim 9, wherein the instructions to selectively execute auto-parking of the vehicle include instructions to control the vehicle to autonomously navigate and park without the presence of an operator in the vehicle, and in response to an override request that affirms that the auto-parking is to proceed.

12. The non-transitory computer-readable medium of claim 9, wherein the instructions to determine whether the age group of the passenger satisfies the auto-park threshold include instructions to i. determine a current location of the vehicle, ii. retrieve the regulations for the current location from a database, and iii. compare the age group of the passenger to the regulations to identify whether performing the auto-parking is permissible according to the regulations, and
wherein the regulations define at least age ranges for which performing auto-parking with the passenger in the vehicle is permissible.

13. The non-transitory computer-readable medium of claim 9, wherein the instructions to analyze the sensor data about the passenger to generate the passenger characteristics include instructions to compute an estimated age of the passenger according to the sensor data by assessing a seating configuration and physical features of the passenger including one or more of weight and height of the passenger, and
wherein the seating configuration identifies at least whether the passenger is seated in a child safety seat.

14. A method of providing auto-parking for a vehicle according to a presence of a passenger, comprising:
in response to receiving a request for the vehicle to auto-park and to determining the passenger is present within the vehicle, analyzing sensor data about the passenger to generate passenger characteristics that indicate at least an age group for the passenger;
determining whether the age group for the passenger satisfies an auto-park threshold that is based, at least in part, on regulations of a locality in which the vehicle is presently located; and
selectively executing auto-parking of the vehicle according to whether the age group of the passenger satisfies the auto-park threshold.

15. The method of claim 14, wherein selectively executing the auto-parking includes denying execution of the auto-parking when at least one of i. the age group does not satisfy the auto-park threshold, and ii. the age group does satisfy the auto-park threshold and a response to an override request is negative, and
wherein the override request is a request communicated to a user interface requesting approval of the auto-parking of the vehicle with the passenger, the override request specifying the regulations to an operator.

16. The method of claim 14, wherein selectively executing auto-parking of the vehicle includes controlling the vehicle to autonomously navigate and park without the presence of an operator in the vehicle, and in response to an override request affirms that the auto-parking is to proceed, and
wherein selectively executing auto-parking includes communicating the override request to the operator when a passenger is present and indicating whether the age group for the passenger satisfies an auto-park threshold.

17. The method of claim 14, wherein determining whether the age group of the passenger satisfies the auto-park threshold includes i. determining a current location of the vehicle, ii. retrieving the regulations for the current location from a database, and iii. comparing the age group of the passenger to the regulations to identify whether performing the auto-parking is permissible according to the regulations, and
wherein the regulations define at least age ranges for which performing auto-parking with the passenger in the vehicle is permissible.

18. The method of claim 14, wherein analyzing the sensor data about the passenger to generate the passenger characteristics includes computing an estimated age of the passenger according to the sensor data by assessing a seating configuration and physical features of the passenger including one or more of weight and height of the passenger, and
wherein the seating configuration identifies at least whether the passenger is seated in a child safety seat.

19. The method of claim 14, further comprising:
determining whether the passenger is present in the vehicle including:
acquiring the sensor data from one or more sensors in the vehicle that include observations of a passenger compartment, and
analyzing the sensor data according to presence criteria to determine whether the sensor data includes patterns of observations matching the presence of at least one passenger in the vehicle.

20. The method of claim 14, further comprising:
in response to executing the auto-parking of the vehicle, monitoring a current state of the passenger including a presence of the passenger in the vehicle and environmental conditions within the vehicle; and
communicating an alert to a user interface when the current state of the passenger exceeds parking criteria, the parking criteria specifying aspects of the presence of the passenger and the environmental conditions to ensure the passenger remains safe.

* * * * *